(12) United States Patent
Gross et al.

(10) Patent No.: US 12,548,808 B2
(45) Date of Patent: Feb. 10, 2026

(54) COMPUTER-IMPLEMENTED SYSTEMS FOR BATTERY MONITORING, BATTERY REPLACEMENT, AND FLEET MANAGEMENT

(71) Applicant: STATE FARM MUTUAL AUTOMOBILE INSURANCE COMPANY, Bloomington, IL (US)

(72) Inventors: Ryan Michael Gross, Normal, IL (US); Matthew S. Megyese, Bloomington, IL (US); Joseph P. Harr, Bloomington, IL (US); Scott T. Christensen, Salem, OR (US); Vicki King, Bloomington, IL (US); Shawn Renee Harbaugh, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 576 days.

(21) Appl. No.: 17/980,977

(22) Filed: Nov. 4, 2022

(65) Prior Publication Data

US 2023/0387481 A1    Nov. 30, 2023

Related U.S. Application Data

(60) Provisional application No. 63/356,248, filed on Jun. 28, 2022, provisional application No. 63/345,588, filed on May 25, 2022.

(51) Int. Cl.
*H01M 10/42* (2006.01)
*G06Q 40/08* (2012.01)

(52) U.S. Cl.
CPC ........ *H01M 10/4257* (2013.01); *G06Q 40/08* (2013.01); *H01M 2010/4271* (2013.01); *H01M 2220/20* (2013.01)

(58) Field of Classification Search
CPC .............. G06Q 40/08; H01M 10/4257; H01M 2010/4271; H01M 2220/20
See application file for complete search history.

(56) References Cited

U.S. PATENT DOCUMENTS

| | | | |
|---|---|---|---|
| 6,044,261 | A | 3/2000 | Kazmi |
| 6,496,689 | B1 | 12/2002 | Keller et al. |

(Continued)

FOREIGN PATENT DOCUMENTS

| | | |
|---|---|---|
| EP | 3239686 A1 | 11/2017 |
| EP | 3578433 B1 | 8/2020 |

(Continued)

*Primary Examiner* — Victoria H Lynch
(74) *Attorney, Agent, or Firm* — MARSHALL, GERSTEIN & BORUN LLP; Randall G. Rueth

(57) ABSTRACT

A server and non-transitory computer-readable storage medium storing instructions for monitoring one or more batteries of an electric vehicle (EV) comprising computing instructions for (i) receiving, from an electronic device associated with the EV, telematics data generated by one or more sensors associated with the electronic device that is indicative of operation of the EV; (ii) determining a battery status of the one or more batteries based upon the telematics data; and (iii) mapping the battery status of the one more batteries to a digital record corresponding to the EV in a database.

18 Claims, 5 Drawing Sheets

(56) References Cited

U.S. PATENT DOCUMENTS

| | | |
|---|---|---|
| 6,814,170 B2 | 11/2004 | Abe et al. |
| 8,212,527 B2 | 7/2012 | Zhang et al. |
| 8,880,252 B2 | 11/2014 | Saito |
| 9,266,529 B2 | 2/2016 | Dufford |
| 9,290,103 B2 | 3/2016 | Bianco |
| 9,311,271 B2 | 4/2016 | Wright |
| 9,358,898 B2 | 6/2016 | Endo et al. |
| 9,469,289 B2 | 10/2016 | Yu |
| 9,550,429 B2 | 1/2017 | Madurai-Kumar et al. |
| 9,633,487 B2 | 4/2017 | Wright |
| 9,718,371 B2 | 8/2017 | Anglin et al. |
| 9,830,748 B2 | 11/2017 | Rosenbaum |
| 9,846,199 B2 | 12/2017 | Vian et al. |
| 9,917,302 B2 | 3/2018 | Jeong et al. |
| 9,990,782 B2 | 6/2018 | Rosenbaum |
| 10,192,369 B2 | 1/2019 | Wright |
| 10,197,631 B2 | 2/2019 | Barfield, Jr. et al. |
| 10,198,879 B2 | 2/2019 | Wright |
| 10,269,190 B2 | 4/2019 | Rosenbaum |
| 10,354,333 B1 | 7/2019 | Hayward |
| 10,437,904 B2 | 10/2019 | Corghi |
| 10,467,824 B2 | 11/2019 | Rosenbaum |
| 10,541,051 B1 | 1/2020 | Farrell |
| 10,663,529 B1 | 5/2020 | Bolotski et al. |
| 10,996,063 B2 | 5/2021 | Kurihashi |
| 11,152,791 B2 | 10/2021 | Qin et al. |
| 11,227,452 B2 | 1/2022 | Rosenbaum |
| 11,407,410 B2 | 8/2022 | Rosenbaum |
| 11,524,707 B2 | 12/2022 | Rosenbaum |
| 11,594,083 B1 | 2/2023 | Rosenbaum |
| 2011/0191186 A1 | 8/2011 | Levy et al. |
| 2011/0225105 A1 | 9/2011 | Scholer et al. |
| 2011/0288712 A1 | 11/2011 | Wang et al. |
| 2011/0301799 A1 | 12/2011 | Saito |
| 2012/0053771 A1 | 3/2012 | Yoshida |
| 2012/0089408 A1 | 4/2012 | Stancil et al. |
| 2012/0133337 A1 | 5/2012 | Rombouts et al. |
| 2012/0296512 A1 | 11/2012 | Lee et al. |
| 2012/0296678 A1 | 11/2012 | Boot et al. |
| 2013/0079962 A1 | 3/2013 | Ishikawa et al. |
| 2013/0317693 A1 | 11/2013 | Jefferies et al. |
| 2015/0112526 A1 | 4/2015 | Martin et al. |
| 2015/0294403 A1 | 10/2015 | Chu et al. |
| 2016/0075246 A1 | 3/2016 | Liptak |
| 2016/0185246 A1 | 6/2016 | Paul |
| 2016/0221567 A1 | 8/2016 | Ogawa |
| 2016/0257301 A1 | 9/2016 | Ogawa |
| 2017/0004712 A1 | 1/2017 | Yang |
| 2017/0361717 A1 | 12/2017 | Qin et al. |
| 2017/0374202 A1 | 12/2017 | Zait et al. |
| 2019/0118655 A1 | 4/2019 | Grimes et al. |
| 2019/0130332 A1 | 5/2019 | Janssen |
| 2019/0215882 A1 | 7/2019 | Kim |
| 2019/0251759 A1 | 8/2019 | Lora et al. |
| 2019/0322270 A1 | 10/2019 | Kurihashi et al. |
| 2020/0019925 A1 | 1/2020 | Tokhtabaev |
| 2020/0164763 A1 | 5/2020 | Holme |
| 2020/0282855 A1 | 9/2020 | Slutzky et al. |
| 2020/0333151 A1 | 10/2020 | Akhtar |
| 2020/0350640 A1 | 11/2020 | Combs et al. |
| 2020/0391612 A1 | 12/2020 | Lee |
| 2020/0393260 A1 | 12/2020 | Falck |
| 2021/0024052 A1 | 1/2021 | Shimada et al. |
| 2021/0118070 A1 | 4/2021 | Taber, Jr. et al. |
| 2021/0131812 A1 | 5/2021 | Gong et al. |
| 2021/0203177 A1 | 7/2021 | Peng |
| 2021/0231450 A1 | 7/2021 | Pedersen |
| 2021/0373082 A1 | 12/2021 | Kupcsik et al. |
| 2022/0026492 A1 | 1/2022 | Verheijen et al. |
| 2022/0026499 A1 | 1/2022 | Zhang et al. |
| 2022/0069368 A1 * | 3/2022 | Hess ............... B60L 53/67 |
| 2022/0092893 A1 | 3/2022 | Rosenbaum |
| 2022/0340148 A1 | 10/2022 | Rosenbaum |
| 2022/0366481 A1 * | 11/2022 | Mezaael ............. G06Q 50/40 |
| 2023/0060300 A1 | 3/2023 | Rosenbaum |
| 2024/0013313 A1 * | 1/2024 | Iida ............... G08G 1/00 |

FOREIGN PATENT DOCUMENTS

| | | | |
|---|---|---|---|
| EP | 3730375 B1 | 10/2021 | |
| EP | 3960576 A1 | 3/2022 | |
| EP | 4190659 A1 | 6/2023 | |
| EP | 4190660 A1 | 6/2023 | |
| WO | WO-2009011875 A2 * | 1/2009 | ............ B60L 1/003 |

* cited by examiner

140A

| EV | Electronic Device | Battery Status | Fleet Management Action | |
|---|---|---|---|---|
| 12-1 | 13-1 | 29% | Replace | ~141A |
| 12-2 | 13-2 | 98% | Transfer To EV 12-1 | ~142A |
| 12-3 | 13-3 | 47% | Remain In Use | ~143A |
| 12-N | 13-N | 57% | Remain In Use | ~144A |

140B

| EV | Electronic Device | Battery Status | Insurance Action | |
|---|---|---|---|---|
| 12-1 | 13-1 | 29% | $225 | ~141B |
| 12-2 | 13-2 | 98% | $100 | ~142B |
| 12-3 | 13-3 | 47% | $150 | ~143B |
| 12-N | 13-N | 57% | $145 | ~144B |

140C

| EV | Electronic Device | Battery Status | Repurposing Action | |
|---|---|---|---|---|
| 12-1 | 13-1 | 29% | Salvage | ~141C |
| 12-2 | 13-2 | 98% | Remain In Use | ~142C |
| 12-3 | 13-3 | 47% | Recharge The Battery | ~143C |
| 12-N | 13-N | 57% | Use As Emergency Power Source | ~144C |

140D

| EV | Electronic Device | Battery Status | Recommended Action | |
|---|---|---|---|---|
| 12-1 | 13-1 | 29% | Your Braking Habits Contributed To A Low Battery Status. | ~141D |
| 12-2 | 13-2 | 98% | Keep Up The Great Driving. | ~142D |
| 12-3 | 13-3 | 47% | Your Cornering Habits Contributed To A Moderate Battery Status. | ~143D |
| 12-N | 13-N | 57% | Your Acceleration Habits Contributed To A Moderate Battery Status. | ~144D |

FIGURE 3

COMPUTER-IMPLEMENTED SYSTEMS FOR BATTERY MONITORING, BATTERY REPLACEMENT, AND FLEET MANAGEMENT

CROSS REFERENCE TO RELATED APPLICATIONS

This application claims priority to and benefit of each of U.S. Provisional Application No. 63/345,588, filed on May 25, 2022 (entitled "Systems and Methods for Battery Monitoring, Battery Replacement, and Fleet Management") and U.S. Provisional Application No. 63/356,248, filed on Jun. 28, 2022 (entitled "Systems and Methods for Battery Monitoring, Battery Replacement, and Fleet Management"). The entire contents of each of the foregoing identified applications are expressly incorporated by reference herein.

FIELD OF THE DISCLOSURE

The present disclosure is directed to technologies associated with monitoring a battery of a vehicle, such as an electric vehicle (EV). In particular, the present disclosure is directed to systems and methods for monitoring a battery of an EV based upon collected data associated with operation of the EV.

BACKGROUND

Technologies associated with operation of EVs (i.e., vehicles that use electric motors for propulsion) are improving and becoming more ubiquitous. As a result, use of EVs (e.g., on roadways, rails, underwater, air, space) is expected to increase, with EVs expected to at least partially replace conventional (i.e., internal combustion engine) vehicles. A typical EV is powered autonomously by a battery (e.g., lithium-ion battery), also known as an electric-vehicle battery (EVB), which is used to power the propulsion system of the EV. The battery can be recharged at a charging station, and may be mechanically replaced at special stations.

It is well known that driving behavior, as well as other factors such as weather, traffic, and routes taken, has a major impact on the fuel consumption of conventional vehicles. For example, harsh acceleration and deceleration of conventional vehicles may lead to inefficient fuel consumption. However, little work has been done with respect to monitoring a battery of an EV based upon these factors.

Accordingly, there is an opportunity for techniques to collect data associated with operation of the EV and monitor the battery of the EV based upon the collected data. Conventional techniques may also be inefficient, inconvenient, ineffective, and/or cumbersome, and may have other drawbacks as well.

BRIEF SUMMARY

According to the present embodiments, methods and systems for (i) collecting telematics data generated during operation of an EV, and (ii) analyzing the collected telematics data to monitor an electric-vehicle battery (EVB) disposed in the EV are described. The methods and system may involve utilizing a pre-existing telematics application (e.g., Drive Safe & Save™ from State Farm®) or other application running on an electronic device (e.g., a mobile electronic device or mobile device) disposed in the EV or a vehicle telematics system onboard the EV), to capture and send telematics data associated with operation of the EV to a server. The telematics data may pertain to driving events (e.g., acceleration, braking, cornering, direction, and speed) and their frequency and/or duration. The telematics data may also pertain to route length and road infrastructure features, weather conditions (e.g., snow, rain, fog, etc.), traffic characteristics (e.g., traffic density, traffic direction, traffic flow, primary EV types in traffic, etc.), and so on. In some cases, the telematics data may pertain to levels of distraction of the driver while driving the EV. Considering that distracted driving often leads to accidents, the telematics data may include data indicating an accident associated with the EV or a predicted accident associated with the EV. In some embodiments, the server may analyze the received telematics data to monitor the battery status of the EV. In other embodiments, the application running on the electronic device may locally analyze the telematics data to monitor the battery status of the EV, and send the battery status to the server.

Accordingly, the present embodiments may, inter alia, enable a fleet management entity, insurance provider, or other suitable individual or entity operating the server to monitor the battery status of one or more EVs. Thus, for example, a fleet management entity may monitor the battery status for each EV in its fleet inventory, and make certain decisions related to the optimum usage and/or cost effectiveness of batteries across its fleet inventory. As another example, an insurance provider may monitor the battery status for a covered EV and make certain decisions related to insurance coverage or assistance depending on the battery age, battery performance, battery manufacturer, etc. As yet another example, an entity (e.g., manufacturer of EV batteries, seller of parts to the manufacturer, vehicle salvage yards, towing company, used car dealers, non-profit organization, fleet management) that manages a battery program may monitor the battery status for each EV in its program, and make certain decisions related to transferring, recycling, recharging, or reusing the batteries.

In one aspect, a computer-implemented method of monitoring one or more batteries of an EV, carried out by one or more local or remote processors, may be provided. The method may include, via one or more processors and/or associated transceivers, (i) receiving, by the one or more processors and from an electronic device associated with the EV, telematics data generated by one or more sensors associated with the electronic device that is indicative of operation of the EV; (ii) determining, by the one or more processors, a battery status of the one or more batteries based upon the telematics data; and/or (iii) mapping, by the one or more processors, the battery status of the one more batteries to a digital record corresponding to the EV in a database. The method may include additional, less, or alternate actions, including those discussed elsewhere herein.

In another aspect, a server for monitoring one or more batteries of an EV, includes a transceiver configured to communicate with an electronic device associated with the EV via at least one network connection; a memory storing a set of computer-executable instructions; and a processor interfacing with the transceiver and the memory, and configured to execute the computer-executable instructions to cause the processor to: (i) receive, from the electronic device, telematics data generated by one or more sensors associated with the electronic device that is indicative of operation of the EV; (ii) determine a battery status of the one or more batteries based upon the telematics data; and/or (iii) map the battery status of the one or more batteries to a digital record corresponding to the EV in a database. The server may include or be configured with additional, less, or alternate functionality, including that discussed elsewhere herein.

In another aspect, a non-transitory computer-readable storage medium storing computer-readable instructions for monitoring one or more batteries of an EV may be provided. The computer-readable instructions, when executed by one or more processors, cause the one or more processors to (i) receive, from an electronic device associated with the EV, telematics data generated by one or more sensors associated with the electronic device that is indicative of operation of the EV; (ii) determine a battery status of the one or more batteries based upon the telematics data; and/or (iii) map the battery status of the one or more batteries to a digital record corresponding to the EV in a database. The computer-executable instructions may direct additional, less, or alternate functionality, including that discussed elsewhere herein.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof.

FIG. 3 depicts exemplary mappings of battery statuses to digital records in a database, according to one embodiment.

DETAILED DESCRIPTION

Figure 1:
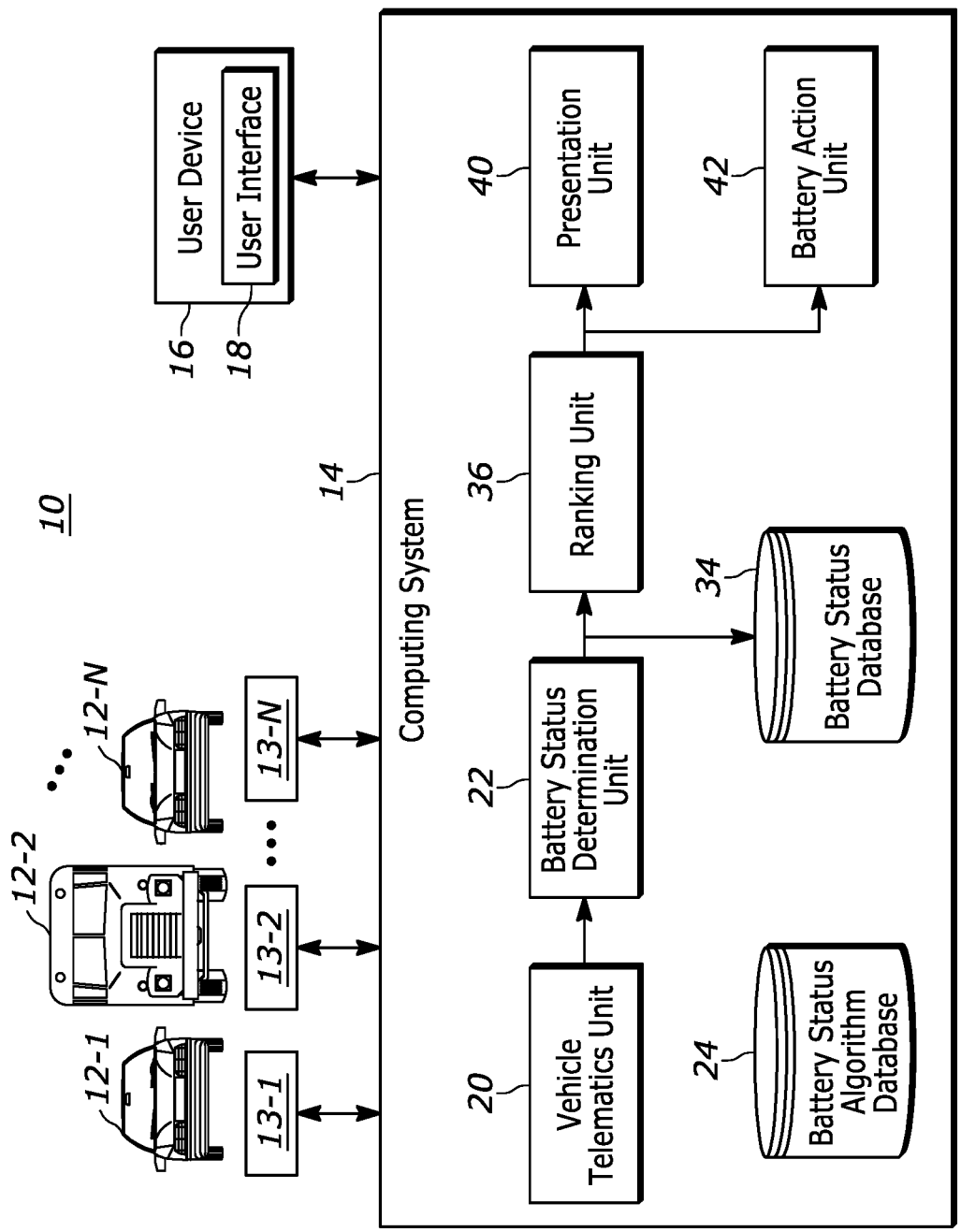
FIG. 1 depicts an exemplary environment including components associated with monitoring batteries of electric vehicles (EVs), according to one embodiment.

The present embodiments relate to systems and methods for determining a battery status of one or more batteries (interchangeably referred to herein as a "battery pack" or simply "battery") of an electric vehicle (EV) based upon telematics data indicative of operation of the EV. The battery status may refer to remaining battery after a single charge (e.g., full charge), or remaining battery capacity after numerous charges. The battery status may depend on telematics data that pertain to driving events (e.g., acceleration, braking, cornering, and speed) and their frequency and/or duration, route length and road infrastructure features, weather conditions (e.g., snow, rain, fog, etc.), traffic characteristics (e.g., traffic density, traffic direction, traffic flow, primary EV types in traffic, etc.), levels of distraction of the driver while driving the EV, and/or other suitable metrics indicative of operation of the EV.

The telematics data may initially be generated by the sub-systems and/or sensors of an EV, and may be collected using an electronic device (e.g., smartphone or mobile device of an occupant (e.g., driver) of the EV and/or a vehicle telematics system onboard the EV). The battery status may then be calculated by processing the telematics data according to a predetermined algorithm. In some embodiments, the algorithm may calculate a telematics data score or sub-scores (e.g., braking sub-score, cornering sub-score, acceleration sub-score, speed sub-score) from the telematics data, and weigh such scores (e.g., weigh a driver's braking sub-score more heavily than the driver's acceleration sub-score, weigh the driver's cornering sub-score more heavily than the driver's braking sub-score, and so on) to determine the battery status.

In some embodiments, the predetermined algorithm may calculate the battery status by processing the telematics data score or sub-scores in conjunction with a baseline reading of the one or more batteries disposed in the EV. The baseline reading may be generated by a battery sensor (e.g., a voltage sensor, a current sensor, a temperature sensor) that is coupled to the one or more batteries of the EV, and collected by the electronic device and/or the vehicle telematics system. In some embodiments, the predetermined algorithm may include a machine learning algorithm trained to predict the battery status using training data that associates different types of telematics data (e.g., cornering telematics data, braking telematics data, acceleration telematics data, speed telematics data) with the battery status.

The battery status may be monitored for different purposes. For example, a fleet management entity may monitor the battery status for each EV in its fleet inventory, and make certain decisions related to the optimum usage and/or cost effectiveness of batteries across its fleet inventory (e.g., rotate batteries among the EVs to maintain a threshold level of battery status among all EVs as a whole, frequently replace a small number of batteries each day/week or infrequently replace a large number of batteries once a year depending on costs, access strategic routing to maintain desired schedule of battery replacements).

As another example, an insurance provider may monitor the battery status for a covered EV and make certain decisions related to insurance coverage or assistance depending on the battery age, battery performance, battery manufacturer, etc. (e.g., determine an insurance premium or discount associated with the EV, generate battery-specific insurance policies or endorsements, provide a lower rate or discount for Emergency Roadside Assistance for customers having a newer battery). As yet another example, an entity (e.g., manufacturer of EV batteries, seller of parts to the manufacturer, vehicle salvage yards, used car dealers, non-profit organization) that manages a battery replacement and/or recycle program may monitor the battery status for each EV in its program, and make certain decisions (e.g., transfer battery in good condition that is included in a damaged EV to a non-damaged EV, recycle old battery into new battery, sell metals such as lithium and cobalt contained in a battery to a manufacturer of new batteries, designate a battery for use as a power source for communities suffering from a natural disaster).

I. Exemplary Environment for Assessing and/or Predicting Battery Status Based Upon Telematics Data FIG. 1 depicts an exemplary environment 10 in which telematics data may be used to assess and/or predict battery status, according to one embodiment. As illustrated in FIG. 1, the environment 10 may include EVs 12-1 through 12-N, a computing system 14, and a user device 16. The EVs 12-1 through 12-N may include EVs such as cars, vans, trucks, motorcycles, and/or any other EV type(s), as well as autonomous and/or semi-autonomous vehicles. Depending on the implementation, the vehicles 12-1 through 12-N may further include solar electric vehicles (solar EVs), EVs with solar panels, or similar EVs that use batteries or power sources that utilize solar power. In some such implementations, the solar EVs have or operate in a solar mode or power option that allows the solar EV to use solar energy as a power source to power the vehicle as well as a traditional power mode or option that relies instead on an EV battery power charged using other sources, e.g., non-solar electrically charged battery power.

In some embodiments, the EVs 12-1 through 12-N may be EVs of a fleet, and the computing system 14 may be associated with a business, agency, or organization for maintaining the fleet. For example, the computing system 14 may include one or more servers of a shipping company, a public utility company, a public transportation company, a car rental company, a police department, a company with a mobile sales force, etc. In such embodiments, the user device 16 may be a computing device of a fleet management entity.

In some embodiments, the EVs 12-1 through 12-N may be EVs covered under insurance policies offered by an insurance provider, and the computing system 14 may be associated with (e.g., include one or more servers of) the insurance provider. In such embodiments, the user device 16 may be a computing device of an insurance provider employee.

The user device 16 may be a terminal device, a personal computer, a laptop computer, a tablet, a smartphone, or any other suitable computing device in communication with the computing system 14. The user device 16 may communicate with the computing system 14 via one or more wired and/or wireless networks not shown in FIG. 1 (e.g., one or more local area networks (LANs), and/or one or more wide area networks (WANs) such as the Internet). Alternatively, the user device 16 may be a part of the computing system 14. The user device 16 may also include a user interface 18 having software and/or hardware components for displaying information to the user and/or accepting inputs from the user (e.g., a web browser application, a graphics card or chip, a monitor or touchscreen, a mouse, a keyboard, etc.).

Each of the EVs 12-1 through 12-N may carry a vehicle telematics system capable of collecting telematics data reflecting operation of the respective EV. For example, the vehicle telematics system in each of EVs 12-1 through 12-N may include sensors and/or subsystems configured to collect any one or more types of telematics data, such as velocity information, acceleration information, braking information, speed information, heading or direction information, steering information, location/position information (e.g., from a GPS system), translational and/or rotational G-force information, on-board diagnostic information, information collected by a camera, video camera, microphone, LiDAR, radar or other device sensing an environment external to the EV (e.g., proximity to other EVs and/or other objects, orientation with respect to other EVs and/or other objects, whether it is sunny, cloudy or dark, external temperature, etc.), automated safety and/or control system information (e.g., adaptive cruise control status and/or when cruise control is engaged/disengaged, forward and/or rear collision warning system outputs, lane departure system outputs, electronic stability control system status, etc.), whether seatbelts are in use, etc.

In some embodiments, the telematics data may include various types of data indicative of features of routes taken by EVs 12-1 through 12-N, such as camera data, LiDAR data and/or data that the EVs 12-1 through 12-N received via vehicle-to-infrastructure (V2I) communications, for example. The features may include static (or semi-static) features, such as route length and road infrastructure features, for example. Road infrastructure features may include any number of different features, such as lane widths for one or more road segments on each route, number of lanes for one or more road segments on each route, type of lane markings for one or more road segments on each route, road surface friction coefficients for one or more road segments on each route, elevation changes for one or more road segments on each route, curve parameters (e.g., frequency of curves, angle, radius, length, apex, bank, etc.) for one or more road segments on each route, intersection parameters (e.g., intervals between intersections, whether a stoplight is present, whether the intersection is a four-way stop, etc.) for one or more road segments on each route, signage parameters (e.g., size of sign, size of letters on sign, etc.) for one or more road segments on each route, bicycle lane parameters (e.g., type, markings, location, etc.) for one or more road segments on each route, and so on.

The features may also (or instead) include one or more dynamic features, such as the conditions in which each route was driven. For example, the features may include weather conditions (e.g., snow, rain, fog, etc.) along one or more road segments of each route, the presence or absence of road construction along one or more road segments of each route, traffic characteristics (e.g., traffic density, traffic direction, traffic flow, primary EV types in traffic, etc.) along one or more road segments of each route, and so on.

In some embodiments, the telematics data collected by the vehicle telematics system may include various types of data indicative of levels of distraction of the driver while driving an EV, such as camera data. For example, an EV may include a camera that is directed towards the face of the driver, and further configured to capture images of the driver. The images may be analyzed by the camera or other component within the EV, to identify characteristics of the driver (e.g., eyes of the driver are open and focused on an object inside the EV, rapidity of eye movement, dilation of eye pupils, blinking, etc.) that are relevant to a distraction level of the driver. In some embodiments, levels of distraction may be determined by the electronic device 13 (i.e., any of the electronic devices 13-1 through 13-N) executing either a pre-existing telematics application (e.g., Drive Safe & Save™ from State Farm®) or a new, native application, and the application may be configured to transmit data associated with the levels of distraction to the vehicle telematics system and/or computing system 14. For instance, the application executing on the electronic device 13 may detect that the driver is interacting with the electronic device 13 while driving an EV. In some embodiments, the telematics data may include actual data (e.g., historical data having various information of a crash such as time of crash, location of crash, etc.) indicating an accident that the EV has been involved with, or predicted data (e.g., a probability that the EV will be involved in a crash in the future based upon various levels of distraction) indicating a predicted accident associated with the EV.

Each vehicle telematics system may provide only raw telematics data (e.g., sensor outputs), or may process some or all of the raw telematics data to provide higher-level information (e.g., orientations of nearby objects, types of weather and/or road conditions, etc.). In different embodiments, different ones of EVs 12-1 through 12-N may have vehicle telematics systems that vary in certain respects, or all of the EVs 12-1 through 12-N may be equipped with the same vehicle telematics systems.

Each of some or all of the vehicle telematics systems (i.e., electronic devices 13-1 through 13-N) in the EVs 12-1 through 12-N may be configured to enable transfer of the collected information to the computing system 14, where the data may be collected by a vehicle telematics unit 20. For example, each of some or all of the vehicle telematics systems may be equipped with a communication system that includes a transmitter and one or more antennas to wirelessly transmit the data to the computing system 14 via a wireless network. Alternatively, each of some or all of the vehicle telematics systems may be equipped with a Bluetooth system that provides the data to respective mobile electronic devices (i.e., electronic devices 13-1 through 13-N), each of which may be a smartphone or other portable device of the driver, and the smartphone or other portable device may transmit the data to the computing system 14 via a wireless network. In some embodiments, the mobile electronic devices may themselves detect at least some of the different types of telematics data described above. Generally speaking, the electronic device 13 (i.e., any of the electronic devices 13-1 through 13-N) may execute a pre-existing telematics application (e.g., Drive Safe & Save™ from State Farm®) or a new, native application to capture and send telematics data associated with operation of the EV to the computing system 14.

In other embodiments, each of some or all of the EVs 12-1 through 12-N may include an interface to a portable memory device, such as a portable hard drive or flash memory device. In some of these latter embodiments, the portable memory device may be used to download data from a EV 12 (i.e., any of the EVs 12-1 through 12-N) and then may be manually carried to the computing system 14. In still other embodiments, the portable memory device may be used to download data from an EV 12 to a driver's computer device (e.g., desktop computer, laptop computer, smartphone, etc.), which may in turn be used to transmit the data to the computing system 14 via wired and/or wireless networks.

The vehicle telematics unit 20 may provide the collected telematics data to a battery status determination unit 22, which may then calculate battery statuses for batteries of EVs 12-1 through 12-N based upon the collected telematics data. For example, the vehicle telematics unit 20 may store the collected telematics data in one or more persistent memories of the computing system 14 (not shown in FIG. 1), and send battery status determination unit 22 an indication when new data is available.

In various different embodiments, battery status determination unit 22 may generate different numbers and/or types of telematics data scores or sub-scores for each EV, and use such telematics data scores or sub-scores to calculate battery statuses for batteries of EVs 12-1 through 12-N. In some embodiments, battery status determination unit 22 may generate scores relating to different types of EV operation (e.g., "smoothness" of acceleration, braking and/or cornering). In some embodiments, battery status determination unit 22 may generate scores relating to levels of distraction of the driver, which may affect EV operation. For example, if a driver's gaze is focused on electronic device 13 inside the EV, it may be likely that the driver is interacting (e.g., texting, accessing an application, browsing the web, etc.) in an extended period of perhaps intense concentration on the electronic device 13. The longer the driver focuses on the electronic device 13, the more likely the driver is to have a higher level of distraction (e.g., and thus a corresponding higher distraction score) from the driving environment. On the other hand, if the driver is only occasionally focusing on the electronic device 13, then the distraction, while still present, may be represented by a lower distraction score. In some embodiments, an application (e.g., Drive Safe & Save™ from State Farm® or a new, native application) executing on the electronic device 13 may generate a distraction score in a similar manner, and provide such distraction score to the battery status determination unit 22.

In some embodiments, battery status determination unit 22 may consider the battery charging mode (e.g., as specified by the International Electrotechnical Commission (IEC)) used to charge the one or more batteries contained in each EV to calculate its battery statuses. Exemplary battery charging modes may be "Mode 1" (slow charging from a regular electrical socket), to "Mode 2" (slow charging from a regular electrical socket but equipped with an EV-specific protection arrangement), "Mode 3" (either slow or fast charging using a specific EV multi-pin socket with control and protection functions) and "Mode 4" (fast charging using a special charger technology).

An example battery status algorithm that may be implemented by battery status determination unit 22 is discussed below in connection with FIG. 2. The battery status algorithm(s) used by battery status determination unit 22 may be stored in a data storage 24 (e.g., read-only memory (ROM) or another type of persistent memory), or in another persistent memory external to the computing system 14 and not shown in FIG. 1, for example.

Battery statuses determined by battery status determination unit 22 may be added to a battery status database 34, which may be stored in a persistent memory, or in another memory external to the computing system 14 and not shown in FIG. 1, for example. Battery statuses may also be provided to a ranking unit 36 to rank the batteries (e.g., based upon its battery statuses) across EVs 12-1 through 12-N. For example, ranking unit 36 may calculate a percentile rank for each battery, a curved-scale grade for each battery (e.g., A, B, C, D or F), or any other measure showing absolute and/or relative battery statuses across EVs 12-1 through 12-N. The rankings calculated by ranking unit 36 may be stored in battery status database 34, or in another memory external to the computing system 14 and not shown in FIG. 1, for example.

In some embodiments, ranks determined by ranking unit 36 may be provided to a presentation unit 40 and/or a battery action unit 42. Alternatively, the battery statuses generated by battery status determination unit 22 may be provided to presentation unit 40 and/or battery action unit 42 directly (i.e., ranking unit 36 may be omitted). Presentation unit 40 may generate information specifying the presentation of the ranks and/or battery statuses on a display, and may send the information to user device 16 for display to the user (e.g., fleet management entity, insurance provider employee, etc.) via user interface 18. The information may be provided via a web page, an email, an application, a text message, and/or in any other suitable manner. In yet other embodiments, the computing system 14 may provide the battery statuses generated by battery status determination unit 22 to the respective EV 12 and/or electronic device via a wireless network. As will be further described below, in some embodiments, the computing system 14 may also generate recommended action data (or recommendation data) identifying aspects of driving performance that resulted in the battery statuses, and/or recommendations to improve driving performance. In such embodiments, the computing system 14 may provide the recommendation data, either in addition to the battery statuses or alternative to the battery statuses, to the respective EV 12 and/or electronic device 13 via a wireless network.

Battery action unit 42 may analyze the ranks and/or battery statuses to determine whether one or more actions should be taken with respect to any of the batteries. To this end, battery action unit 42 may utilize one or more thresholds. For example, battery action unit 42 may determine that an action is advisable or required if a battery status or rank falls below a particular threshold (e.g., a threshold tied to one battery or a threshold tied to multiple batteries such as when the batteries belong to EVs of a fleet).

The action taken by battery action unit 42 may depend on the setting in which the environment 10 is used. If used for fleet management, battery action unit 42 may cause an indication (e.g., that the batteries across a fleet inventory of EVs 12-1 through 12-N should be rotated and/or replaced to maintain certain threshold) to be provided to the fleet management entity (e.g., via presentation unit 40 and user interface 18), and/or may automatically initiate a battery rotation/replacement process. As a result, the fleet management may rotate/replace batteries among the EVs to maintain a threshold level of battery status among all EVs as a whole, for example. As another example, and based upon the indication, the fleet management may frequently replace a small number of batteries each day/week or infrequently replace a large number of batteries once a year depending on costs. As yet another example, and based upon the indication, the fleet management may access strategic routing to maintain desired schedule of battery replacements.

If used in an insurance setting, battery action unit 42 may use the ranks and/or battery statuses to determine risk ratings for the drivers of EVs 12-1 through 12-N, or may provide the ranks and/or battery statuses to a different computing system that handles a risk underwriting process, for example. The risk underwriting process may factor in other aspects of batteries that may be stored in database 34, such as the age of the particular battery, typical performance of the particular battery, manufacturer of the particular battery, etc. Once a risk rating is determined for a driver, the rating may be used by battery action unit 42 (or another unit and/or computing system) to determine a premium for an insurance policy (e.g., a battery-specific insurance policy) for that driver, or a discount for Emergency Roadside Assistance for customers having a newer battery that has a healthy battery status, for example. The risk ratings may also, or instead, be provided to user device 16 for display via user interface 18 (e.g., using presentation unit 40).

Other settings are also contemplated. For example, an entity (e.g., manufacturer of EV batteries, seller of parts to the manufacturer, vehicle salvage yards, used car dealers, non-profit organization) that manages a battery replacement and/or recycle program may monitor the battery status for each EV in its program, and make certain decisions (e.g., transfer battery in good condition that is included in a damaged EV to a non-damaged EV, recycle old battery into new battery, sell metals such as lithium and cobalt contained in a battery to a manufacturer of new batteries, designate a battery for use as a power source for communities suffering from a natural disaster) based upon the ranks and/or battery statuses provided by the battery action unit 42. As another example, an entity (e.g., towing company, fleet management) may monitor the battery status for an EV to determine whether to recharge the battery. If the battery status for an EV is low, the entity may determine to recharge the battery of the EV using any various means, such as by using any of the battery charging modes described above. Other means of recharging are also contemplated, such as flat towing the EV and bi-directional jump charging the EV with another EV. In some cases, the EV having the low battery status may request a tow charge to the entity and potentially couple itself to and decouple itself from a tow vehicle while in motion. In some embodiments, the entity managing the computing system 14 may determine from the type of telematics data (e.g., data indicating flat towing of the EV, pushing of the EV, bi-directional jump charging of the EV with another EV, or whether the EV is coupled to another vehicle) received from the electronic device 13 that the EV is in a charging state, and subsequently determine the battery status based upon the telematics data.

In some embodiments, each of some or all of units 20, 22, 36, 40 and 42 may be (or may include) a respective set of one or more processors that executes software instructions to perform the functions described above, or some or all of the units 20, 22, 36, 40 and 42 may share a set of one or more processors. Alternatively, each of some or all of units 20, 22, 36, 40 and 42 may be a component of software that is stored on a computer-readable medium (e.g., a random access memory (RAM) and/or read-only memory (ROM) of the computing system 14) and executed by one or more processors of the computing system 14 to perform the functions described herein. In some embodiments, the computing system 14 may include more, fewer and/or different units than are shown in FIG. 1, including any of the components discussed elsewhere herein. For example, either presentation unit 40 or battery action unit 42 may be omitted, and/or ranking unit 36 may be omitted.

As can be seen from the above discussion, the components in the environment 10, when using the above techniques, may allow a fleet management entity, insurance provider, or other individual or entity associated with the computing system 14 to determine battery statuses based upon received telematics data. Moreover, with the usage of objective telematics data, the determination may be made accurately and without manually delving into the subjective details underlying an individual's driving performance or driving conditions. As such, the resource usage or consumption of the components in the environment 10 (e.g., in the computing system 14 and/or the user device 16) that otherwise would be spent on collecting such subjective details may be reduced. Accordingly, fewer processor cycles may be utilized by the computing system 14 and/or the user device 16.

II. Exemplary Battery Status Algorithm

Figure 2:
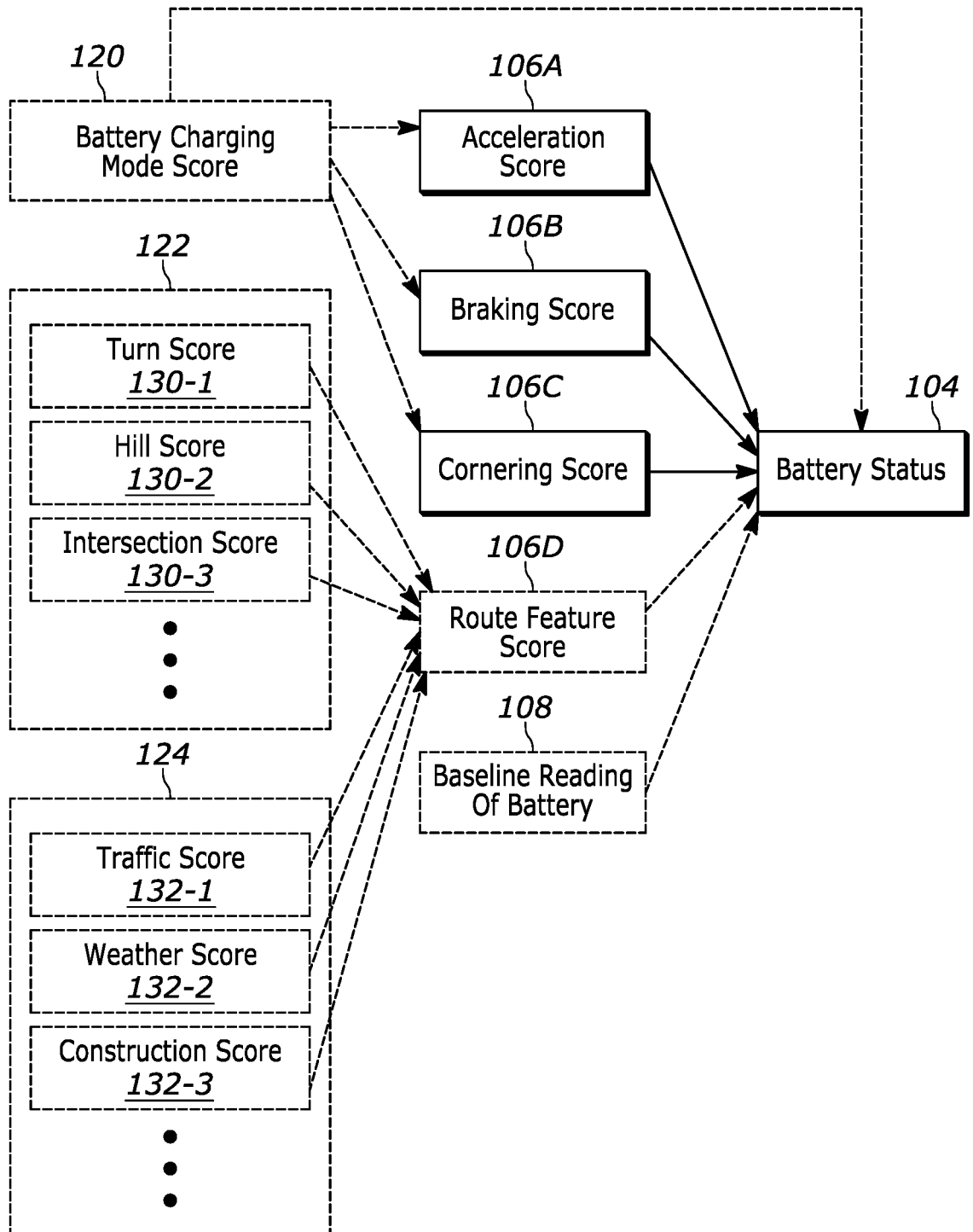
FIG. 2 depicts an exemplary battery status algorithm, according to one embodiment.

FIG. 2 depicts an exemplary battery status algorithm 100, according to one embodiment. The battery status algorithm 100 may be stored in the database 24 of FIG. 1, and used by battery status determination unit 22 to generate a battery status 104, e.g., for any one of the EVs 12-1 through 12-N. While FIG. 2 shows only a single battery status 104 for clarity, one or more additional battery statuses calculated in a manner similar to battery status 104 may also be generated and used.

The battery status 104 may be calculated using a plurality of telematics data sub-scores 106, e.g., generated by battery status determination unit 22 or other component not shown in FIG. 1 that is configured to provide the telematics data sub-scores to the battery status determination unit 22. In the exemplary embodiment of FIG. 2, the telematics data sub-scores 106 include an acceleration score 106A indicative of the driver's acceleration behaviors (e.g., how smoothly the driver accelerates), a braking score 106B indicative of the driver's braking behaviors (e.g., how smoothly the driver brakes), and a cornering score 106C indicative of the driver's cornering behaviors (e.g., how smoothly the driver takes turns). In other embodiments and/or scenarios, however, the battery status 104 may be calculated using fewer sub-scores, more sub-scores, and/or different sub-scores than are shown in FIG. 2.

For example, in some embodiments, the battery status 104 may be calculated using battery charging mode scores 120 generated by the computing system 14 based upon a particular battery charging mode 120 (e.g., Mode 1, Mode 2, Mode 3, or Mode 4 described above) used to charge the one or more batteries of any of EVs 12-1 through 12-N. For instance, the computing device 14 may monitor which battery charging modes are used to charge any of EVs 12-1 through 12-N, and determine a correlation between battery charging modes and driving behaviors. The correlation may indicate that drivers who habitually use certain modes (e.g., Modes 1-3) tend to exhibit driving behavior (e.g., safer driving behavior) different from those who habitually use other modes (e.g., Mode 4). According to the correlation, the computing device 14 may assign a predetermined battery charging mode score 120 to each battery charging mode, and the battery status 104 may be calculated using such battery charging mode scores 120, either as replacement scores for the telematics data sub-scores 106 described above or as supplemental scores to the telematics data sub-scores 106, when calculating the battery status 104. As a relatively simple example of using the battery charging mode scores 120 as a supplement to the telematics data sub-scores 106, the battery status 104 may be calculated based upon a weighted sum function of the battery charging mode scores 120 and the telematics data sub-scores 106.

As another example, in one embodiment, the battery status 104 may be calculated using a route feature score 106D associated with features of routes taken by any of EVs 12-1 through 12-N described above. A relatively high battery status indicating a healthy battery may be lowered if the driver was driving a route scored as having a high difficulty level (e.g., many sharp turns, many steep elevation changes, heavy traffic, etc.), and/or a relatively low battery status indicating a less healthy battery may be raised if the driver was driving a route scored as being a fuel efficient route (e.g., no turns or swerves, no hills, less traffic, etc.). As a relatively simple example, a raw battery status may be a number between 1 and 100, a route score may be a number between 1 and 100, and a normalized battery status may be equal to the raw battery status times the route score divided by 100.

In some embodiments, the route feature score 106D may be calculated for a particular route using a set of static and/or semi-static route feature sub-scores 122, and/or a set of dynamic route feature sub-scores 124. For example, sub-score set 122 may include a turn score 130-1, a hill score 130-2, an intersection score 130-3, and/or one or more other sub-scores specific to various other static and/or semi-static route features, and sub-score set 124 may include a traffic score 132-1, a weather score 132-2, a construction score 132-3, and/or one or more other sub-scores specific to various other dynamic route features. The sub-scores within the sub-score set 122 may be individually and/or collectively weighted, and/or the sub-scores within the sub-score set 124 may be individually and/or collectively weighted.

The turn score 130-1 may be generated using one or more features/parameters of turns/curves within the route to be scored. For example, the turn score 130-1 may be generated based upon the frequency of turns (e.g., turns per mile, etc.), the angles of turns/curves, the turn radii, the lengths of the turns, the turn apex, and so on.

The hill score 130-2 may be generated using one or more features/parameters of hills/slopes within the route to be scored. For example, the hill score 130-2 may be generated based upon the frequency of hills (e.g., hills per mile having more than some threshold positive or negative slope, etc.), the slopes of hills, the lengths and/or elevation changes of hills, and so on.

The intersection score 130-3 may be generated using one or more features/parameters of intersections within the route to be scored. For example, the intersection score 130-3 may be generated based upon the frequency of intersections (e.g., intersections per mile, etc.), intervals between intersections, types of signage or lights at intersections, whether intersections are four-way stops, and so on.

The traffic score 132-1 may be generated using one or more features/parameters of traffic along the route to be scored (e.g., traffic as it existed at, or generally around, the time that the driver performance data was generated). For example, the traffic score 132-1 may be generated based upon traffic density (e.g., estimated vehicles per 100 feet, or average distance between cars, etc.), traffic flow (e.g., traffic speed and/or consistency of traffic speed), traffic direction, primary types of vehicles in traffic (e.g., estimate of percentage of traffic due to large trucks, etc.), and so on.

The weather score 132-2 may be generated using one or more features/parameters of weather along the route to be scored (e.g., weather as it existed at, or generally around, the time that the telematics data was generated). For example, the weather score 132-2 may be generated based upon the presence or absence of rain, snow, fog, etc.

The construction score 132-3 may be generated using one or more features/parameters of construction (road work) along the route to be scored (e.g., construction as it existed at, or generally around, the time that the telematics data was generated). For example, the construction score 132-3 may be generated based upon the presence or absence of construction, the frequency of construction zones, the lengths of construction zones, the number of closed lanes, and so on.

In another embodiment, the battery status 104 may be calculated using a baseline reading or score 108 of the one or more batteries disposed in the any of EVs 12-1 through 12-N described above. For example, any of the scores 106, 130, and/or 132 shown in FIG. 2 may be subtracted from the baseline reading or score 108 to determine the battery status 104.

In some embodiments of the battery status algorithm 100 described above, any of the scores or sub-scores shown in FIG. 2 may be weighted in predetermined manner when used to calculate a higher-level score and/or the battery status 104. Moreover, additional or fewer levels of scoring may be implemented.

In some embodiments, the battery status algorithm 100 may be a machine learning algorithm or model (e.g., neural network) that may be used by the computing system 14 (e.g., battery status determination unit 22) to predict a battery status based upon received telematics data and/or battery charging mode. The model may be trained with a supervised learning technique (e.g., using training data that includes a dataset of numerous pairings of known telematics data and its associated known battery status) or other suitable learning technique to infer a correlation between the telematics data and the battery status, and/or a correlation between battery charging modes and driving behaviors. For example, based upon the correlation, the battery status algorithm 100 may identify which weights to apply to the telematics data scores or sub-scores and/or battery charging mode scores described above to predict a battery status having minimum error relative to a known battery status.

III. Exemplary Mapping of Battery Status to Digital Record

FIG. 3 depicts exemplary mappings 140A-140D of a plurality of battery statuses to respective digital records, each of which corresponds to a particular EV, in a database. Generally speaking, the exemplary mappings 140A-140D may be performed by one or more processors of a server or other computer device of a computing system, such as a server or other computer device within computing system 14 of FIG. 1, for example. The digital records may be stored in a database 34 of FIG. 1.

Generally, as shown in FIG. 3, mapping 140 (i.e., any of mappings 140A-140D) may include digital records 141-144 (i.e., any of 141A-144A, 141B-144B, 141C-144C, or 141D-144D) corresponding to respective EVs (e.g., EVs 12-1, 12-2, 12-3, and 12-N) and/or their associated electronic devices (e.g., electronic devices 13-1, 13-2, 13-3, and 13-N). Each EV and/or electronic device may be identified in the mapping 140 by respective identifiers, such as a VIN, IMEI, or any other suitable identifier for identifying the EV and/or electronic device, in some cases over a network. Each digital record may include a battery status (e.g., battery status 104 generated by battery status determination unit 22) of one or more batteries contained in an EV, and action data (e.g., generated by battery action unit 42) that indicates an action that should be taken with respect to the one or more batteries based upon the battery status of the EV. The server or other computer device within computing system 14 of FIG. 1 may extract and transmit the action data from the mapping 140 to an external computing device (e.g., the user device 16 and/or one of the electronic devices 13-1 through 13-N) for display at the external computing device.

The action data may depend on the setting in which the environment 10 is used. If used for fleet management, as shown in mapping 140A, action data may be fleet management action data indicative of whether batteries should remain in use in a particular EV or rotated and/or replaced, e.g., to maintain a threshold level of battery status among all EVs as a whole. For example, if a particular fleet desires to keep all batteries across its fleet above a certain battery status threshold of 45%, action data corresponding to EV 12-1 having a battery status of 29% may indicate to replace the battery of EV 12-1 with one that has a battery status at or above 45%. In some cases, the replacement battery may come from a battery disposed in another vehicle, e.g., EV 12-2.

If used in an insurance setting, as shown in mapping 140B, action data may be insurance action data indicative of a premium for an insurance policy (e.g., a battery-specific insurance policy), or a discount for Emergency Roadside Assistance. For example, the premium or discount may be based upon whether or by how much the battery status is above or below a certain battery status threshold.

If used in a setting for manufacturing and repurposing batteries (e.g., for entities like a manufacturer of EV batteries, seller of parts to the manufacturer, vehicle salvage yards, towing company, used car dealers, non-profit organization, fleet management), as shown in mapping 140C, action data may be repurposing action data indicative of whether to, based upon the battery status, transfer a battery from one EV to another EV, recycle the battery, sell the battery (or materials thereof), recharge the battery, designate the battery for use as a power source for communities suffering from a natural disaster, etc. For example, the repurposing action data may be based upon whether or by how much a battery status is above or below a certain battery status threshold.

If used in a setting for recommending driving tips to improve the battery status, as shown in mapping 140D, action data may be recommended action data identifying aspects of driving performance that resulted in the battery status, and/or recommendations to improve driving performance. For example, for a low battery status (e.g., 29%) that resulted from a low braking sub-score, the recommended action data may indicate that the driver's braking habits contributed to the low battery status, and further include a recommendation to gradually apply the brakes. As another example, for a moderate battery status (e.g., 47%, 57%) that resulted from either a low cornering sub-score or a low acceleration sub-score, the recommended action data may indicate that the driver's cornering or acceleration habits contributed to the moderate battery status, and further include a recommendation to lower the driving speed.

In some embodiments, in any of the settings described above, the battery status determination unit 22 may utilize a machine learning algorithm or model (e.g., the battery status algorithm 100) to generate/predict the action data. The model may be trained with a supervised learning technique (e.g., using training data that includes a dataset of numerous groupings of known telematics data, its associated known battery status, and known action data related to optimum usage and/or cost effectiveness), unsupervised learning technique, deep or combined learning technique, or other suitable learning technique to infer a correlation among the telematics data, the battery status, and the action data.

Figure 4:
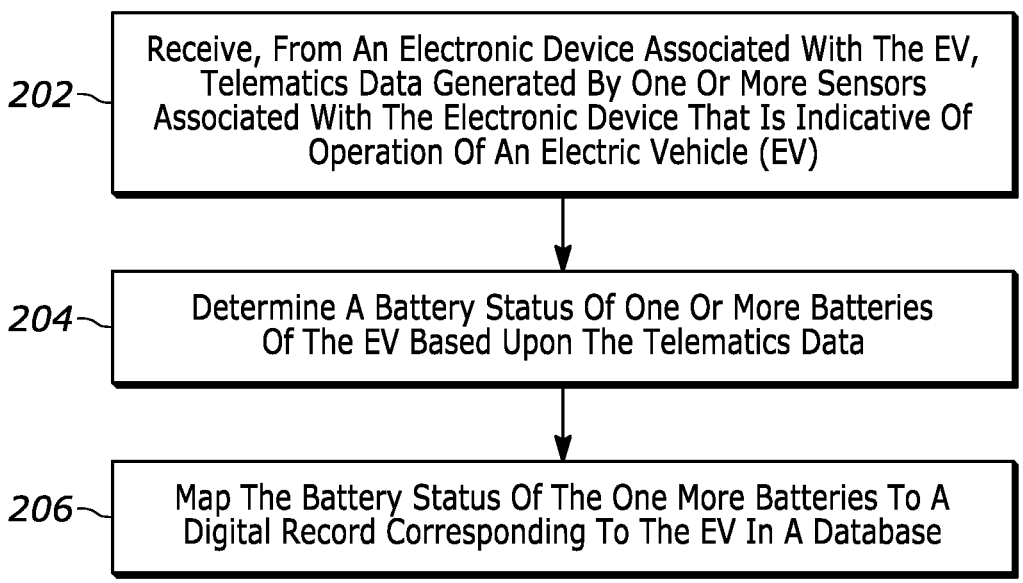
FIG. 4 depicts a flow diagram of an exemplary computer-implemented method for determining a battery status of an EV based upon telematics data, according to one embodiment.

IV. Exemplary Method for Monitoring One or More Batteries of an EV Using Telematics Data FIG. 4 depicts a flow diagram of an exemplary computer-implemented method 200 for monitoring one or more batteries of an EV using telematics data associated with operation of the EV, according to one embodiment. In one embodiment, the method 200 may be implemented in (e.g., performed by one or more processors and/or transceivers of) a server or other computer device of a computing system, such as a server or other computer device within computing system 14 of FIG. 1, for example.

In the method 200, telematics data indicative of operation of an EV while the EV was driven on a driving route may be received (block 202). Block 202 may be performed by vehicle telematics unit 20 of FIG. 1, for example. The telematics data may be received by any suitable technique (s), such as any of the techniques for obtaining telematics data described above in connection with FIG. 1 (e.g., from an electronic device 13 associated with the EV 12, transferring driving data to/from a portable memory, using wired and/or wireless communications, etc.), for example. In some embodiments, the telematics data may be generated by sensor(s) associated with the electronic device 13. These sensor(s) may be installed within the EV 12 or within the electronic device 13 itself.

The telematics data may be indicative of the operation of the EV over time. For example, the telematics data may be indicative of acceleration, braking and/or cornering of the EV over time. The telematics data may also be indicative of one or more other factors, such as translational and/or rotational G-force information, on-board diagnostic information, information collected by a camera, video camera, microphone, LiDAR, radar, or other device sensing an environment external to the EV (e.g., proximity to other EVs and/or other objects, orientation with respect to other EVs and/or other objects, etc.), automated safety and/or control system information (e.g., adaptive cruise control status and/or when cruise control is engaged/disengaged, forward and/or rear collision warning system outputs, lane departure system outputs, electronic stability control system status, etc.), whether seatbelts are in use, road features reflecting the structure and/or configuration of portions of the road(s) of the route, the signage and/or other traffic control infrastructure along the route, levels of distraction from driving, etc.

A battery status of one or more batteries of the EV may be calculated using the telematics data received at block 202 (block 204). Block 204 may be performed by battery status determination unit 22 of FIG. 1, and/or using battery status algorithm 100 of FIG. 2, for example. In some embodiments, the battery status for one or more batteries included in the EV may be calculated using a plurality of telematics data sub-scores 106 (e.g., acceleration score 106A, a braking score 106B, and/or a cornering score 106C). In some embodiments, the battery status may additionally or alternatively depend on a battery charging mode score 120. In some embodiments, the battery status may additionally or alternatively depend on a distraction score. In some embodiments, the battery status may additionally or alternatively depend on route feature score 106D and/or a baseline reading 108 of the one or more batteries.

The battery status determined at block 204 may be mapped to a digital record corresponding to the EV in a database (block 206). Block 206 may be performed by battery status determination unit 22 of FIG. 1. The digital record may be stored in database 34. In some embodiments, the digital record may also include predefined additional data that populates depending on the battery status, as described above in FIG. 3. Other additional data included in the digital record is contemplated, such as an indication of the physical location of the one or more batteries onboard the EV where the one or more batteries are installed, and an indication of whether the EV is damaged, and if so, to what extent (e.g., bumper damage, total loss damage).

Although method 200 describes mapping a single battery status for a single EV in the database, method 200 may include mapping a plurality of battery statuses (e.g., at least a first battery status and a second battery status) for a plurality of EVs (e.g., at least a first EV and a second EV) in the database. In some embodiments, the method 200 may include one or more blocks not shown in FIG. 4.

For example, and with reference to mapping 140A of FIG. 3, the method 200 may include a first additional block in which the first battery status (e.g., 29%) of one or more batteries of the first EV (e.g., EV 12-1) is detected to not satisfy a predetermined threshold (e.g., 50%), and the second battery status (e.g., 98%) of one or more batteries of the second EV (e.g., EV 12-2) is detected to satisfy the predetermined threshold, and a second additional block in which one or more batteries of the first EV is determined to be replaced with one or more batteries of the second EV.

As another example, if at the first additional block the first battery status is detected to satisfy the predetermined threshold, and the first EV is damaged according to data included in a digital record associated with the first EV, the second additional block may include determining to transfer the one or more batteries of the first EV to the second EV based upon the damage data.

As yet another example, assuming the first EV and the second EV belong to a fleet, if at the first additional block the first battery status indicates that the one or more batteries of the first EV has less charge than the one or more batteries of the second EV indicated by the second battery status, the second additional block may include maintaining an overall battery status of the fleet by 1) rotating the one or more batteries of the second EV from the second EV to the first EV, or 2) rotating out the first EV with the second EV.

As another example, the method 200 may include a first additional block in which the battery status and any recommended action data included in the digital record (e.g., mapping 140D) is accessed and retrieved, and a second additional block in which the battery status and the recommended action data is transmitted to an electronic device (e.g., electronic device 13). The electronic device may be identified based upon its association with an EV in the digital record. For instance, with reference to mapping 140D, the method 200 may include transmitting the battery status and the recommended action data for EV 12-2 to electronic device 13-2 based upon EV 12-2 and electronic device 13-2 belonging to the same digital record 142D.

As another example, the method 200 may include a first additional block in which an insurance premium or discount (e.g., mapping 140B) associated with the EV based upon the battery status is determined, and a second additional block in which the battery status and the insurance premium or discount is transmitted to an electronic device (e.g., electronic device 13, user device 16, or other user device).

As yet another example, the method 200 may include an additional block in which the digital record in the database is updated, to designate that the one or more batteries of the EV is to be replaced, transferred to another EV, recycled, or used as an emergency power source (e.g., mapping 140C) based upon the battery status.

As yet another example, the method 200 may include an additional block in which any aspect of the digital record described above (e.g., fleet management action data, insurance action data, repurposing action data, recommended action data, physical battery location) is rendered on a graphical user interface (GUI). The GUI may be associated with the mobile electronic 13 or the user device 16.

Figure 5:
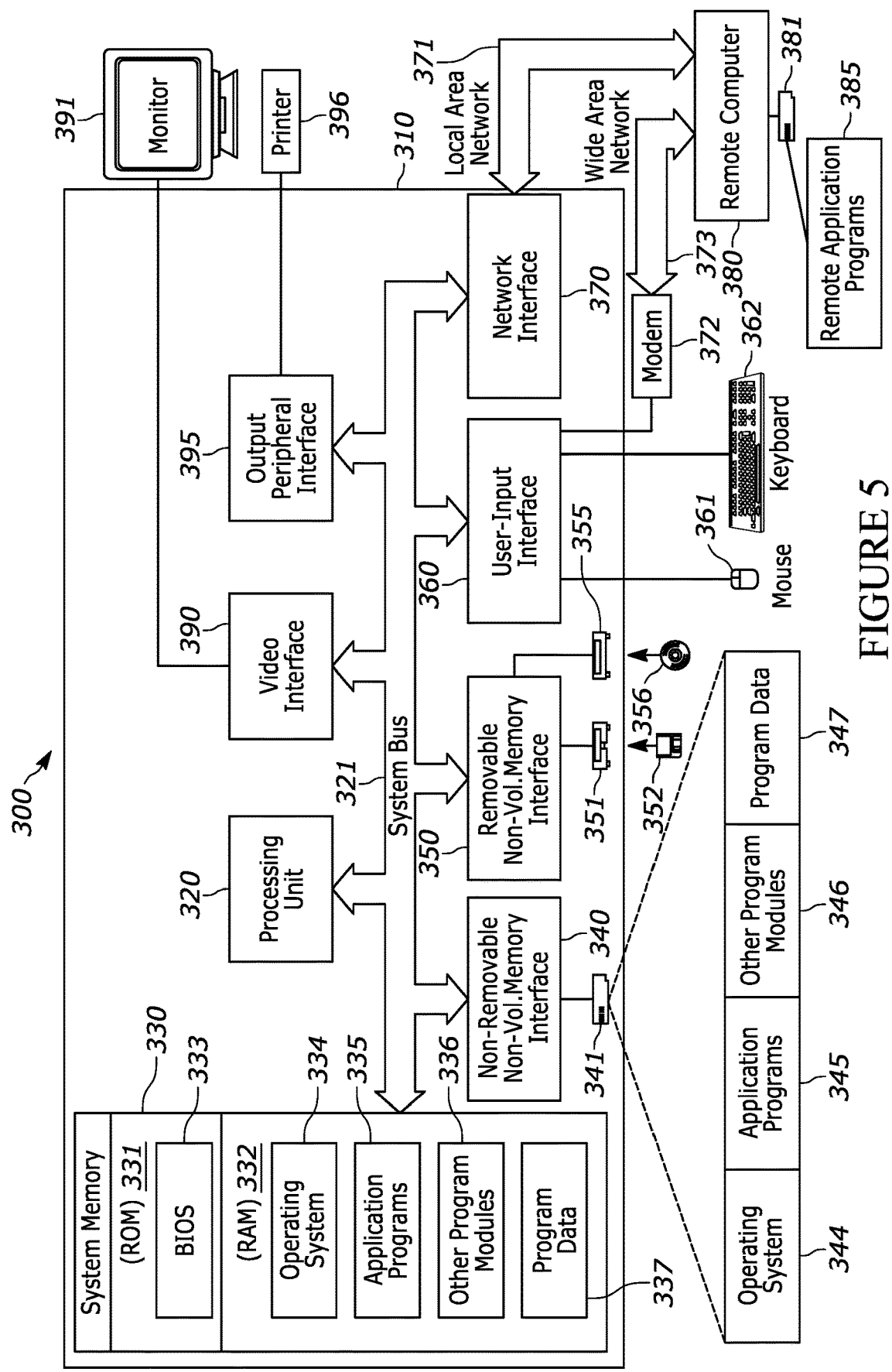
FIG. 5 depicts an exemplary computer system in which the techniques described herein may be implemented, according to one embodiment.

V. Exemplary Computer System for Using Telematics Data to Determine and Monitor Battery Status FIG. 5 depicts an exemplary computer system 300 in which the techniques described herein may be implemented, according to one embodiment. The computer system 300 of FIG. 5 may include a computing device in the form of a computer 310. Components of the computer 310 may include, but are not limited to, a processing unit 320, a system memory 330, and a system bus 321 that couples various system components including the system memory 330 to the processing unit 320. The system bus 321 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 310 may include a variety of computer-readable media. Computer-readable media may be any available media that can be accessed by computer 310 and may include both volatile and nonvolatile media, and both removable and non-removable media. By way of example, and not limitation, computer-readable media may comprise computer storage media and communication media.

Computer storage media may include volatile and nonvolatile, removable and non-removable media implemented in any method or technology for storage of information such as computer-readable instructions, data structures, program modules or other data. Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310.

Communication media typically embodies computer-readable instructions, data structures, program modules or other data in a modulated data signal such as a carrier wave or other transport mechanism, and may include any information delivery media. The term "modulated data signal" means a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared and other wireless media. Combinations of any of the above are also included within the scope of computer-readable media.

The system memory 330 may include computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to, and/or presently being operated on, by processing unit 320. By way of example, and not limitation, FIG. 5 illustrates operating system 334, application programs 335, other program modules 336, and program data 337.

The computer 310 may also include other removable/non-removable, volatile/nonvolatile computer storage media. By way of example only, FIG. 5 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 may be connected to the system bus 321 through a non-removable memory interface such as interface 340, and magnetic disk drive 351 and optical disk drive 355 may be connected to the system bus 321 by a removable memory interface, such as interface 350.

The drives and their associated computer storage media discussed above and illustrated in FIG. 5 provide storage of computer-readable instructions, data structures, program modules and other data for the computer 310. In FIG. 5, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 310 through input devices such as cursor control device 361 (e.g., a mouse, trackball, touch pad, etc.) and keyboard 362. A monitor 391 or other type of display device is also connected to the system bus 321 via an interface, such as a video interface 390. In addition to the monitor, computers may also include other peripheral output devices such as printer 396, which may be connected through an output peripheral interface 395.

The computer 310 may operate in a networked environment using logical connections to one or more remote computers, such as a remote computer 380. The remote computer 380 may be a personal computer, a server, a router, a network PC, a peer device or other common network node, and may include many or all of the elements described above relative to the computer 310, although only a memory storage device 381 has been illustrated in FIG. 5. The logical connections depicted in FIG. 5 include a local area network (LAN) 371 and a wide area network (WAN) 373, but may also include other networks. Such networking environments are commonplace in hospitals, offices, enterprise-wide computer networks, intranets and the Internet.

When used in a LAN networking environment, the computer 310 is connected to the LAN 371 through a network interface or adapter 370. When used in a WAN networking environment, the computer 310 may include a modem 372 or other means for establishing communications over the WAN 373, such as the Internet. The modem 372, which may be internal or external, may be connected to the system bus 321 via the input interface 360, or other appropriate mechanism. The communications connections 370, 372, which allow the device to communicate with other devices, are an example of communication media, as discussed above. In a networked environment, program modules depicted relative to the computer 310, or portions thereof, may be stored in the remote memory storage device 381. By way of example, and not limitation, FIG. 5 illustrates remote application programs 385 as residing on memory device 381.

The techniques for using telematics data to assess battery status described above may be implemented in part or in their entirety within a computer system such as the computer system 300 illustrated in FIG. 5. The computer 310 may be a computing device of a fleet management entity or insurance provider employee (e.g., user device 16 of FIG. 1), for example, and the remote computer 380 may be a server device (e.g., within computing system 14 of FIG. 1) that receives telematics data, e.g., from electronic device 13, and determines a battery status. In some such embodiments, the LAN 371 or the WAN 373 may be omitted. Application programs 335 and 345 may include a software application (e.g., a web-browser application) that is included in user interface 18 of FIG. 1, for example. Computer 310 may receive from computer 380 data indicating battery statuses and/or ranks, for example.

VI. Additional Considerations

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" or "some embodiments" means that a particular element, feature, structure, or characteristic described in connection with the embodiment is included in at least one embodiment. The appearances of the phrase "in one embodiment" or "in some embodiments" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process of using scores to assess and/or predict battery status. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A server for monitoring one or more batteries of an electric vehicle (EV), the server comprising:
 a transceiver configured to communicate with an electronic device associated with the EV via at least one network connection;
 a memory storing a set of computer-executable instructions; and
 a processor interfacing with the transceiver and the memory, and configured to execute the computer-executable instructions to cause the processor to:
  receive, from the electronic device, telematics data generated by one or more sensors associated with the electronic device that is indicative of operation of the EV;
  determine a battery status of the one or more batteries based upon the telematics data, wherein the EV is a first EV and the battery status is a first battery status;
  map the battery status of the one or more batteries to a digital record corresponding to the EV in a database, wherein the digital record is a first digital record including the first battery status;
  map a second battery status of one more batteries of a second EV to a second digital record corresponding to the second EV in the database;
  detect that the first battery status satisfies a predetermined threshold and that the first EV is damaged; and
  in response to the detecting, determine to transfer the one or more batteries of the first EV to the second EV.

2. The server of claim 1, wherein the processor is configured to execute the computer-executable instructions to cause the processor to determine the battery status based upon a baseline reading of the one or more batteries originating from a battery sensor contained in the EV and coupled to the one or more batteries.

3. The server of claim 1, wherein the processor is configured to execute the computer-executable instructions to cause the processor to determine the battery status based upon a battery charging mode associated with the one or more batteries.

4. The server of claim 1, wherein the telematics data comprises data indicating an accident associated with the EV or a predicted accident associated with the EV.

5. The server of claim 1, wherein the telematics data comprises data indicating flat towing of the EV, pushing of the EV, bi-directional jump charging of the EV with another EV, or whether the EV is coupled to another vehicle.

6. The server of claim 1, wherein the processor is configured to execute the computer-executable instructions to cause the processor to determine the battery status based upon a machine learning algorithm trained to predict the battery status using training data that associates different types of telematics data with the battery status.

7. The server of claim 1, wherein the processor is configured to execute the computer-executable instructions to further cause the processor to:
 access the database to retrieve the battery status of the one or more batteries and corresponding recommendation data that includes instructions for improving the battery status; and
 transmit, to the electronic device, at least one of the battery status and the recommendation data.

8. The server of claim 1, wherein the processor is configured to execute the computer-executable instructions to further cause the processor to:
 determine an insurance premium or discount associated with the EV based upon the battery status; and
 transmit, to the electronic device, the insurance premium or the discount.

9. The server of claim 1, wherein the processor is configured to execute the computer-executable instructions to further cause the processor to:
 update, in the database, the digital record to designate that the one or more batteries are to be, based upon the battery status in relation to a predetermined threshold, at least one of (1) replaced, (2) transferred to another EV, (3) recycled, (4) used as an emergency power source, or (5) recharged.

10. The server of claim 1, wherein the processor is configured to execute the computer-executable instructions to further cause the processor to:
 detect that the first battery status does not satisfy a predetermined threshold and the second battery status satisfies the predetermined threshold; and
 in response to the detecting, determine to replace the one or more batteries of the first EV with the one or more batteries of the second EV.

11. The server of claim 1, wherein:
 the first EV and the second EV belong to a fleet of vehicles,
 the processor is configured to execute the computer-executable instructions to further cause the processor to:
  detect that the first battery status indicates that the one or more batteries of the first EV has less charge than the one or more batteries of the second EV indicated by the second battery status; and in response to the detecting, maintain an overall battery status of the fleet by (1) rotating the one or more batteries of the second EV from the second EV to the first EV or (2) rotating out the first EV with the second EV.

12. The server of claim 11, wherein the processor is configured to execute the computer-executable instructions to cause the processor to maintain the overall battery status based upon a machine learning algorithm trained to predict the overall battery status of the fleet using training data that associates individual battery status of each vehicle in the fleet with the overall battery status of the fleet.

13. The server of claim 1, wherein the processor is configured to execute the computer-executable instructions to cause the processor to map the battery status of the one or more batteries to include a mapping of a battery location for at least one of the one or more batteries, wherein the battery location indicates a physical location onboard the EV where the battery is installed.

14. The server of claim 13, wherein the processor is configured to execute the computer-executable instructions to further cause the processor to:
render the mapping of the battery location on a graphical user interface (GUI) indicating where the EV and the battery location are depicted.

15. The server of claim 1, wherein the electronic device is one of a mobile electronic device or a vehicle telematics system onboard the EV.

16. A non-transitory computer-readable storage medium storing computer-readable instructions for monitoring one or more batteries of an electric vehicle (EV) that, when executed by one or more processors, cause the one or more processors to:

receive, from an electronic device associated with the EV, telematics data generated by one or more sensors associated with the electronic device that is indicative of operation of the EV;

determine a battery status of the one or more batteries based upon the telematics data, wherein the EV is a first EV and the battery status is a first battery status;

map the battery status of the one or more batteries to a digital record corresponding to the EV in a database, wherein the digital record is a first digital record including the first battery status;

map a second battery status of one more batteries of a second EV to a second digital record corresponding to the second EV in the database;

detect that the first battery status satisfies a predetermined threshold and that the first EV is damaged; and in response to the detecting, determine to transfer the one or more batteries of the first EV to the second EV.

17. The non-transitory computer-readable storage medium of claim 16, wherein the computer-readable instructions, when executed by the one or more processors, cause the one or more processors to determine the battery status based upon a baseline reading of the one or more batteries originating from a battery sensor contained in the EV and coupled to the one or more batteries.

18. The non-transitory computer-readable storage medium of claim 16, wherein the computer-readable instructions, when executed by the one or more processors, cause the one or more processors to determine the battery status based upon a battery charging mode associated with the one or more batteries.

* * * * *